(12) United States Patent
Suzumura et al.

(10) Patent No.: US 9,834,962 B2
(45) Date of Patent: Dec. 5, 2017

(54) VEHICLE DOOR LOCK APPARATUS

(71) Applicant: AISIN SEIKI KABUSHIKI KAISHA, Kariya-shi, Aichi (JP)

(72) Inventors: Makoto Suzumura, Chita (JP); Takashi Nishio, Kariya (JP); Nobuko Takasu, Takahama (JP); Yasuhiko Sono, Hekinan (JP); Masayuki Tomochika, Anjo (JP); Masanari Iwata, Ichinomiya (JP); Yusuke Yamada, Kariya (JP)

(73) Assignee: AISIN KEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 333 days.

(21) Appl. No.: 14/430,382

(22) PCT Filed: Aug. 2, 2013

(86) PCT No.: PCT/JP2013/071009
§ 371 (c)(1),
(2) Date: Mar. 23, 2015

(87) PCT Pub. No.: WO2014/045731
PCT Pub. Date: Mar. 27, 2014

(65) Prior Publication Data
US 2015/0247347 A1    Sep. 3, 2015

(30) Foreign Application Priority Data

Sep. 24, 2012 (JP) ................. 2012-209635

(51) Int. Cl.
*E05B 79/22* (2014.01)
*E05B 79/20* (2014.01)
(Continued)

(52) U.S. Cl.
CPC .............. *E05B 79/22* (2013.01); *E05B 79/20* (2013.01); *E05B 85/00* (2013.01); *E05B 85/02* (2013.01);
(Continued)

(58) Field of Classification Search
CPC ........ E05B 85/02; E05B 77/34; E05B 13/001; E05B 17/002; B60N 2/4673; E05Y 2900/538; Y10S 292/38
See application file for complete search history.

(56) References Cited

U.S. PATENT DOCUMENTS

2002/0074805 A1* 6/2002 Perkins ................... E05B 81/06
292/14
2002/0167177 A1* 11/2002 Erices .................... E05B 77/04
292/201

(Continued)

FOREIGN PATENT DOCUMENTS

EP    1 155 920 A2    11/2001
GB    2 235 682 A     3/1991
(Continued)

OTHER PUBLICATIONS

International Search Report (PCT/ISA/210) dated Sep. 10, 2013, by the Japanese Patent Office as the International Searching Authority for International Application No. PCT/JP2013/071009.

(Continued)

*Primary Examiner* — Mark Williams
(74) *Attorney, Agent, or Firm* — Buchanan Ingersoll & Rooney PC (57) ABSTRACT

A vehicle door lock device includes: a housing having an opening; a coupling member configured to be coupled to an operation mechanism arranged on a door; an operation lever arranged inside the housing and coupled to the coupling member through the opening; and a cover capable of opening and closing the opening and a coupling point between the coupling member and the operation lever. The cover is separate from the housing and assembled to the housing to be mountable on and demountable from the housing and rotatable between opened and closed states. Each of the housing and the cover includes: a temporary retaining (Continued)

mechanism to temporarily retain the cover in the opened state when the cover is assembled to the housing in a rotatable manner; and a full retaining mechanism configured to retain the cover in the closed state when the cover is rotatably assembled to the housing.

18 Claims, 9 Drawing Sheets

(51) Int. Cl.
| | |
|---|---|
| *E05B 85/02* | (2014.01) |
| *E05B 85/00* | (2014.01) |
| *E05C 17/00* | (2006.01) |
| *E05D 7/10* | (2006.01) |
| *E05D 11/10* | (2006.01) |
| *B60J 5/04* | (2006.01) |
| *E05B 15/00* | (2006.01) |

(52) U.S. Cl.
CPC .......... *E05C 17/025* (2013.01); *E05D 7/1066* (2013.01); *E05D 11/1007* (2013.01); *B60J 5/0416* (2013.01); *E05B 2015/0066* (2013.01); *E05Y 2900/538* (2013.01); *Y10T 292/08* (2015.04)

(56) References Cited

U.S. PATENT DOCUMENTS

| | | |
|---|---|---|
| 2011/0254287 A1 | 10/2011 | Akizuki et al. |
| 2012/0174692 A1 | 7/2012 | Haida et al. |

FOREIGN PATENT DOCUMENTS

| | | |
|---|---|---|
| JP | 2002-129813 A | 5/2002 |
| JP | 2011-132694 A | 7/2011 |
| JP | 2011-220094 A | 11/2011 |
| JP | 2012-107426 A | 6/2012 |
| JP | 2012-180702 A | 9/2012 |
| JP | 2013-036242 A | 2/2013 |
| WO | 2011/023262 A2 | 3/2011 |

OTHER PUBLICATIONS

Written Opinion (PCT/ISA/237) dated Sep. 10, 2013, by the Japanese Patent Office as the International Searching Authority for International Application No. PCT/JP2013/071009.

The extended European Search Report dated Apr. 11, 2016, by the European Patent Office in corresponding European Patent Application No. 13839581.9-1603. (6 pages).

* cited by examiner

VEHICLE DOOR LOCK APPARATUS

TECHNICAL FIELD

The present invention relates to a vehicle door lock device.

BACKGROUND ART

As a vehicle door lock device, there is a vehicle door lock device disclosed in, for example, Patent Literature 1. This vehicle door lock device includes a housing having an opening and being configured to be assembled to a door of a vehicle, a coupling member having a coupling portion and being configured to be coupled to an operation mechanism arranged on the door, an operation lever being arranged inside the housing and having a coupling portion coupled to the coupling portion of the coupling member through the opening, and a cover openable and closable so as to expose and hide the opening and a coupling point between the coupling member and the operation lever.

CITATION LIST

Patent Literature

[PTL 1] JP 2011-132694 A

In the above-mentioned vehicle door lock device disclosed in Patent Literature 1, the cover is arranged on the housing in a rotatable manner.

SUMMARY OF INVENTION

Technical Problem

Incidentally, in the above-mentioned vehicle door lock device disclosed in Patent Literature 1, the position of the cover relative to the housing is not determined before the cover is assembled to the housing (that is, before the cover is fixed to the housing so as to close the opening of the housing). As a result, there is a risk in that the cover may hinder work of, for example, coupling the coupling member and the operation lever through the opening of the housing.

Solution to Problem

A vehicle door lock device according to one embodiment of the present invention has been provided in view of the above-mentioned problem. The vehicle door lock device includes:

a housing having an opening and being configured to be assembled to a door of a vehicle;

a coupling member having a coupling portion and being configured to be coupled to an operation mechanism arranged on the door;

an operation lever being arranged inside the housing and having a coupling portion coupled to the coupling portion of the coupling member through the opening; and a cover openable and closable so as to expose and hide the opening and a coupling point between the coupling member and the operation lever, the cover being constructed separately from the housing and assembled to the housing so as to be mountable on and demountable from the housing and rotatable between an opened state and a closed state, each of the housing and the cover including:

a temporary retaining mechanism configured to temporarily retain the cover in the opened state relative to the housing under a state in which the cover is assembled to the housing in a rotatable manner; and a full retaining mechanism configured to retain the cover in the closed state relative to the housing under the state in which the cover is assembled to the housing in a rotatable manner.

Note that, in the above-mentioned opened state of the cover, the opening of the housing is in an opened state without being closed by the cover, whereas, in the above-mentioned closed state of the cover, the opening of the housing is in a state of being closed by the cover.

When carrying out the present invention as described above, the housing and the cover may be made of different synthetic resins (for example, the housing is made of polyacetal and the cover is made of polypropylene so that the materials are different in hardness). Further, the housing or the cover may include a guide configured to regulate movement of the cover relative to the housing when the cover assembled to the housing in a rotatable manner is rotated between the opened state and the closed state. In this case, one of the housing and the cover (for example, the housing) may include a retaining piece (retaining portion), another of the housing and the cover (for example, the cover) may include a rod (engagement portion) engageable with and disengageable from the retaining piece and rotatable relative to the retaining piece, and the rod may include a tapered portion that functions as the guide. In this case, the temporary retaining mechanism may include: a locking hole portion formed in the retaining piece; and a locking claw portion formed on the rod and elastically engageable with the locking hole portion.

Further, when carrying out the present invention as described above, the cover may include a see-through portion (for example, a transparent portion, a translucent portion, or a thin portion) configured such that the coupling point between the coupling member and the operation lever is visible from outside the cover in the closed state. In this case, the see-through portion (thin portion) may be formed by thinning a part of the cover.

Advantageous Effects of Invention

In the vehicle door lock device according to the one embodiment of the present invention, the cover is constructed separately from the housing, and is assembled to the housing so as to be mountable on and demountable from the housing and rotatable between the opened state and the closed state. Further, each of the housing and the cover includes the temporary retaining mechanism configured to temporarily retain the cover in the opened state relative to the housing under the state in which the cover is assembled to the housing in a rotatable manner, and the full retaining mechanism configured to retain the cover in the closed state relative to the housing under the state in which the cover is assembled to the housing in a rotatable manner.

Therefore, in the present invention, the temporary retaining mechanism can temporarily retain the cover in the opened state relative to the housing. Thus, during work of coupling (or decoupling) the coupling member and the operation lever through the opening of the housing, the cover is not freely moved, thereby being capable of easily carrying out the above-mentioned work without any hindrance of the work by the cover. Further, the full retaining mechanism can retain the cover in the closed state relative to the housing. Thus, the cover can appropriately close the opening of the housing.

When the housing and the cover are made of different synthetic resins (for example, the housing is made of polyacetal and the cover is made of polypropylene) for carrying out the present invention as described above, it is possible to suppress hit noise between the housing and the cover. Further, when the housing or the cover includes the guide configured to regulate the movement of the cover relative to the housing when the cover assembled to the housing in a rotatable manner is rotated between the opened state and the closed state, it is possible to attain satisfactory assemblability when the cover assembled to the housing in a rotatable manner is rotated between the opened state and the closed state. In this case, when one of the housing and the cover includes the retaining piece (retaining portion), another of the housing and the cover includes the rod (engagement portion) engageable with and disengageable from the retaining piece and rotatable relative to the retaining piece, and the rod includes the tapered portion that functions as the guide, it is possible to form the guide simply at low cost.

Further, when the cover includes the see-through portion (for example, a transparent portion, a translucent portion, or a thin portion) configured such that the coupling point between the coupling member and the operation lever is visible from outside the cover in the closed state for carrying out the present invention as described above, the coupling state between the coupling member and the operation lever can be confirmed without opening the cover in the closed state. As a result, the workability can be enhanced.

DESCRIPTION OF EMBODIMENT

Figure 1:
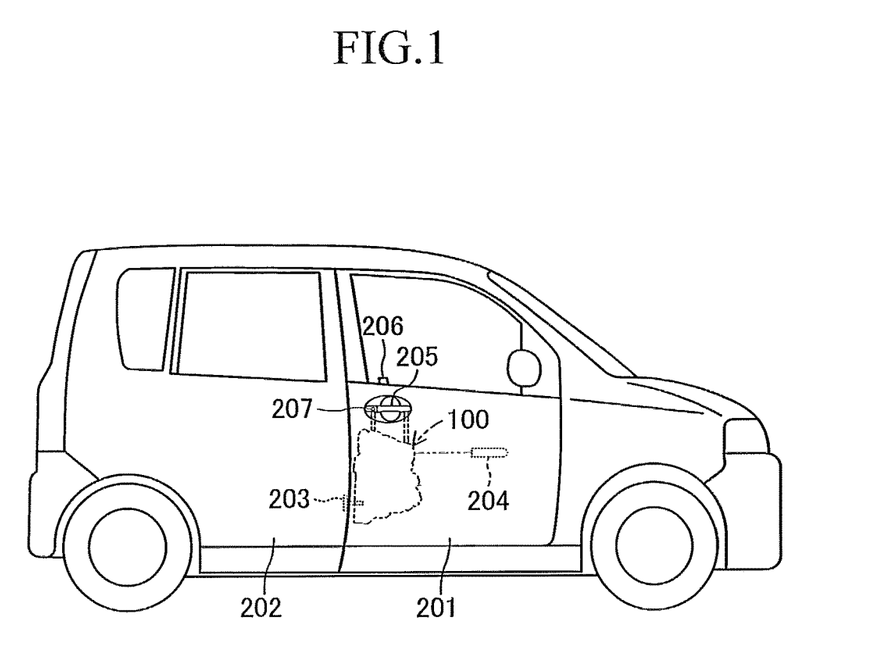
FIG. 1 is a side view of a vehicle door lock device according to an embodiment of the present invention as seen from an outer side of a vehicle.
Figure 2:
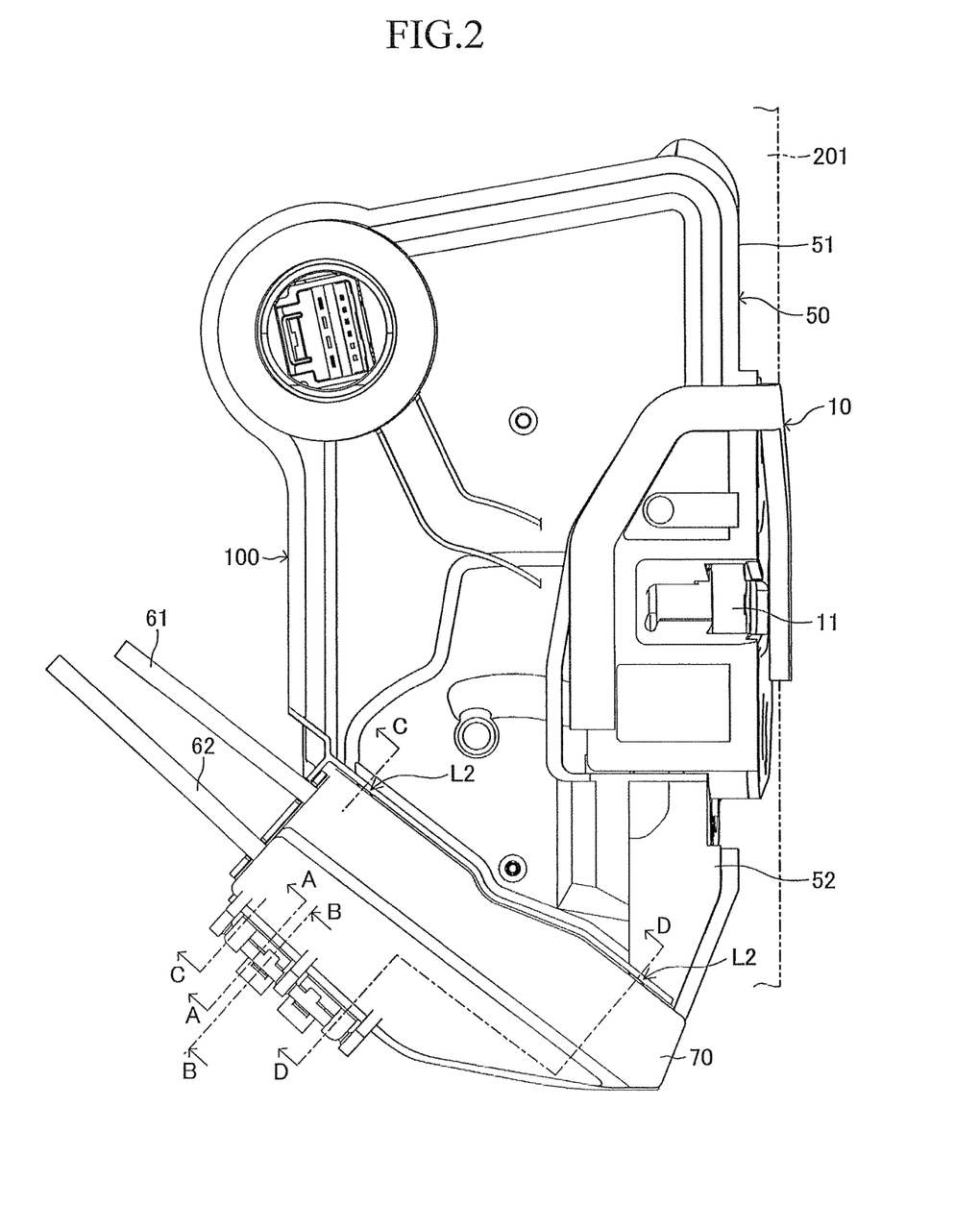
FIG. 2 is an enlarged side view of the vehicle door lock device illustrated in FIG. 1 as seen from an inner side of the vehicle.
Figure 3:
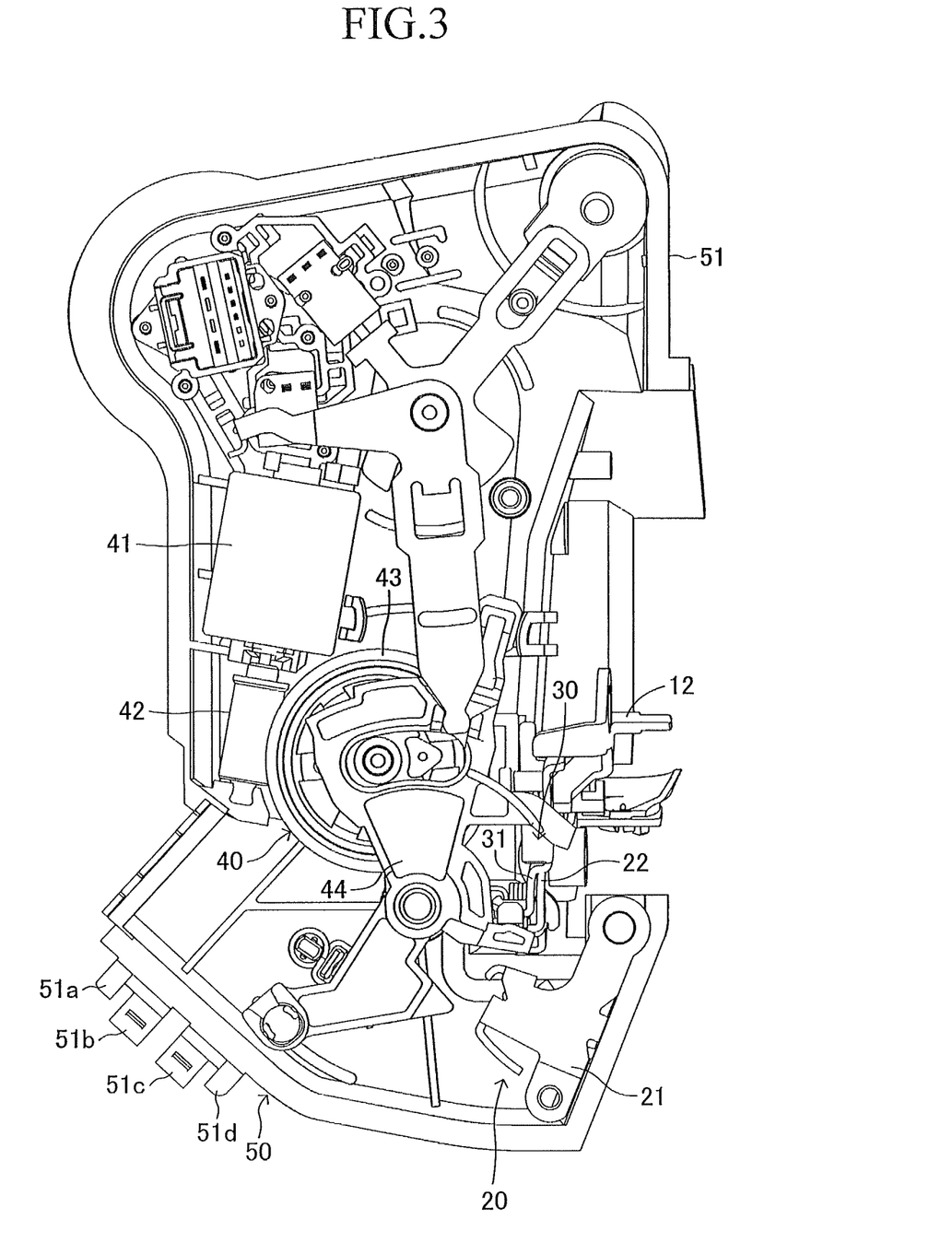
FIG. 3 is a view illustrating the structure inside a housing of the vehicle door lock device illustrated in FIG. 2.

Now, an embodiment of the present invention is described with reference to the drawings. FIGS. 1 to 12 illustrate a vehicle door lock device 100 according to the embodiment of the present invention. The vehicle door lock device 100 is mounted on a door 201 (see FIG. 1) to be installed at a front right side of a vehicle. As illustrated in FIGS. 2 and 3, the vehicle door lock device 100 includes a latch mechanism 10, a lever mechanism 20, a link mechanism 30, and an electric actuator 40, which are assembled to a housing 50.

As is well known, the latch mechanism 10 is configured to retain the door 201 of the vehicle on a body (vehicle body) 202 (see FIG. 1) in a closed state (state in which the door 201 is closed). The latch mechanism 10 includes a latch 11 engageable with and disengageable from a striker 203 (see FIG. 1) fixed to the body 202. The latch mechanism 10 is configured to be assembled to the door 201 together with the housing 50 under a state in which the latch mechanism 10 is assembled to the housing 50.

The lever mechanism 20 includes an inside open lever 21 to be driven along with an operation of an inside door handle 204 (see FIG. 1) arranged at an inner side of the door 201, and an outside open lever 22 to be driven along with an operation of an outside door handle 205 (see FIG. 1) arranged at an outer side of the door 201. The inside open lever 21 is assembled to the housing 50, and is coupled to the inside door handle 204 through an operation cable 61 illustrated in FIGS. 2 and 4 (may be implemented by an operation force transmitting member such as a link), thereby being driven through the operation of the inside door handle 204. The outside open lever 22 is assembled to the housing 50, and is coupled to the outside door handle 205 through an operation force transmitting member such as a link (details are not shown), thereby being driven through the operation of the outside door handle 205.

The link mechanism 30 is interposed between the latch mechanism 10 and the lever mechanism 20 inside the housing 50. The link mechanism 30 includes an open link 31 switchable between an unlock state for enabling operation force transmission from the lever mechanism 20 to the latch mechanism 10 and a lock state for disabling the operation force transmission. The open link 31 is interposed between each of the inside open lever 21 and the outside open lever 22 of the lever mechanism 20 and a lift lever 12 of the latch mechanism 10, and is switchable between an unlock position for transmitting, to the lift lever 12, actuation of each of the open levers 21 and 22 in a door opening direction along with the door opening operation of each of the door handles 204 and 205 (for enabling the operation force transmission) and a lock position for avoiding the transmission of the actuation to the lift lever 12 (for disabling the operation force transmission).

The electric actuator 40 is assembled to the housing 50, and is capable of switching the link mechanism 30 between the unlock state and the lock state. The electric actuator 40 includes an electric motor 41, a worm 42, and a worm wheel 43, and further includes an active lever 44 to be driven by those components. Note that, the active lever 44 is coupled to a lock knob 206 (see FIG. 1) arranged on the door 201 at the inner side of the vehicle through an operation cable 62 illustrated in FIGS. 2 and 4, thereby being drivable also through a manual operation of the lock knob 206. Further, the active lever 44 is also coupled to a key cylinder 207 (see FIG. 1) arranged at the outer side of the door 201, thereby being drivable also through a manual operation of the key cylinder 207.

The housing 50 includes a first housing part 51 and a second housing part 52 joined and integrated with each other by laser welding (joining portions thereof are joined to each other by laser welding). In FIG. 3, the second housing part 52 is removed. As illustrated in FIG. 2, a cover 70 is assembled to the housing 50, and two openings 52a1 and 52a2 formed in the second housing part 52, a coupling point between the operation cable 61 (coupling member) and the inside open lever 21 (operation lever) coupled through the opening 52a1, and a coupling point between the operation cable 62 (coupling member) and the active lever 44 (operation lever) coupled through the opening 52a2 are exposed and hidden with the cover 70.

Figure 4:
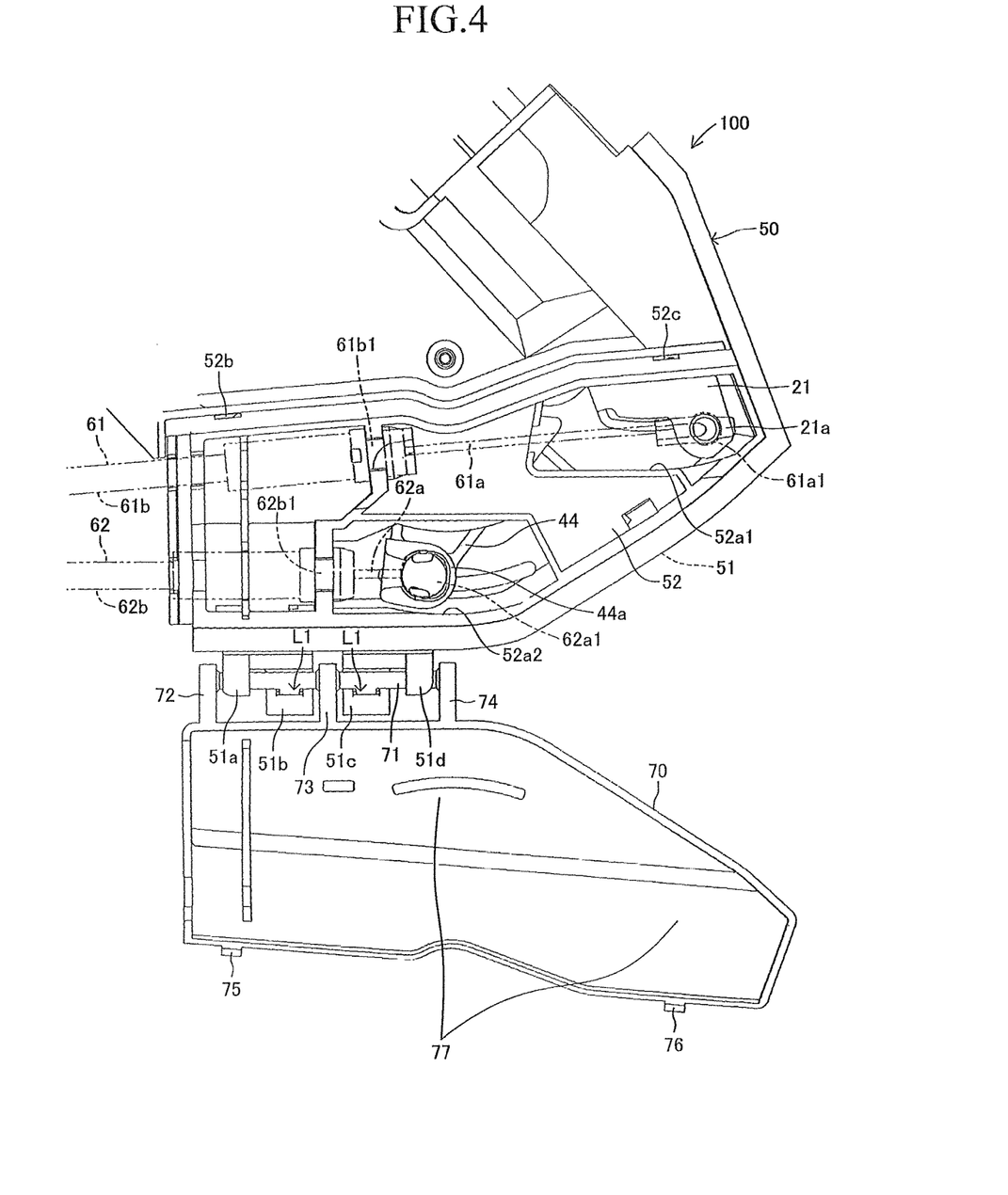
FIG. 4 is a main-part enlarged view illustrating two operation cables indicated by the imaginary lines in an opened state of a cover illustrated in FIG. 2.

The operation cable 61 is a coupling member configured to couple, in an interlockable manner, the inside door handle 204 (operation mechanism) arranged on the door 201 and the inside open lever 21 (operation lever) arranged inside the housing 50. As illustrated in FIG. 4, the operation cable 61 includes an inner wire 61a and an outer tube 61b. The inner wire 61a has one end coupling portion 61a1 coupled to a coupling portion 21a of the inside open lever 21 through the opening 52a1, and another end coupling portion (not shown) coupled to a tiltable coupling portion (not shown) of the inside door handle 204. The outer tube 61b has one end portion 61b1 fixed to the housing 50 and the cover 70, and another end portion (not shown) fixed to a support bracket (not shown) of the inside door handle 204.

The operation cable 62 is a coupling member configured to couple, in an interlockable manner, the lock knob 206 (operation mechanism) arranged on the door 201 and the active lever 44 (operation lever) arranged inside the housing 50. As illustrated in FIG. 4, the operation cable 62 includes an inner wire 62a and an outer tube 62b. The inner wire 62a has one end coupling portion 62a1 coupled to a coupling portion 44a of the active lever 44 through the opening 52a2, and another end coupling portion (not shown) coupled to a reciprocable coupling portion (not shown) of the lock knob 206. The outer tube 62b has one end portion 62b1 fixed to the housing 50 and the cover 70, and another end portion (not shown) fixed to a support bracket (not shown) of the lock knob 206.

Incidentally, in this embodiment, the cover 70 is constructed separately from the housing 50, and is assembled to the housing 50 so as to be mountable on and demountable from the housing 50 and rotatable between an opened state and a closed state. Specifically, a rod (engagement portion) 71 formed on the cover 70 is assembled to four retaining pieces (retaining portions) 51a, 51b, 51c, and 51d formed in two pairs on the first housing part 51 of the housing 50 so that the cover 70 is mountable on and demountable from the housing 50 and rotatable between the opened state and the closed state. The housing 50 (first housing part 51 and second housing part 52) is made of a synthetic resin (for example, polyacetal). The cover 70 is made of another synthetic resin (for example, polypropylene). Note that, both end portions and a center portion of the rod 71 of the cover 70 are supported by three arms 72, 73, and 74 formed integrally with the cover 70.

Figure 5:
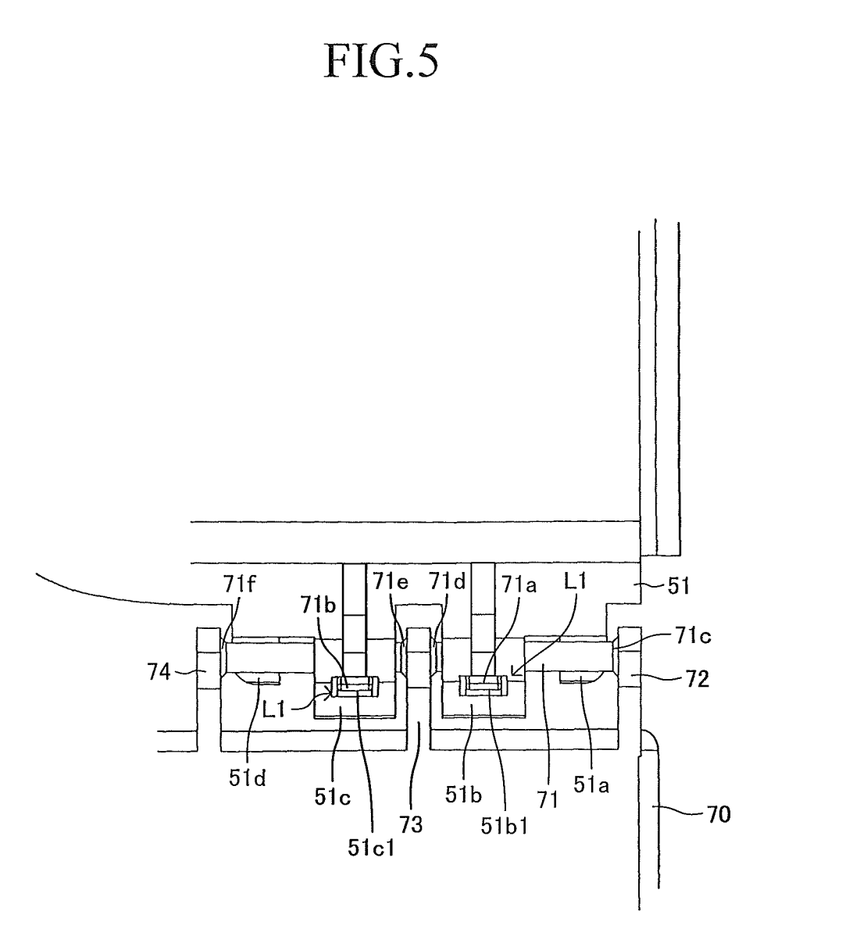
FIG. 5 is a partial back view of the housing and the cover illustrated in FIG. 4.
Figure 6:
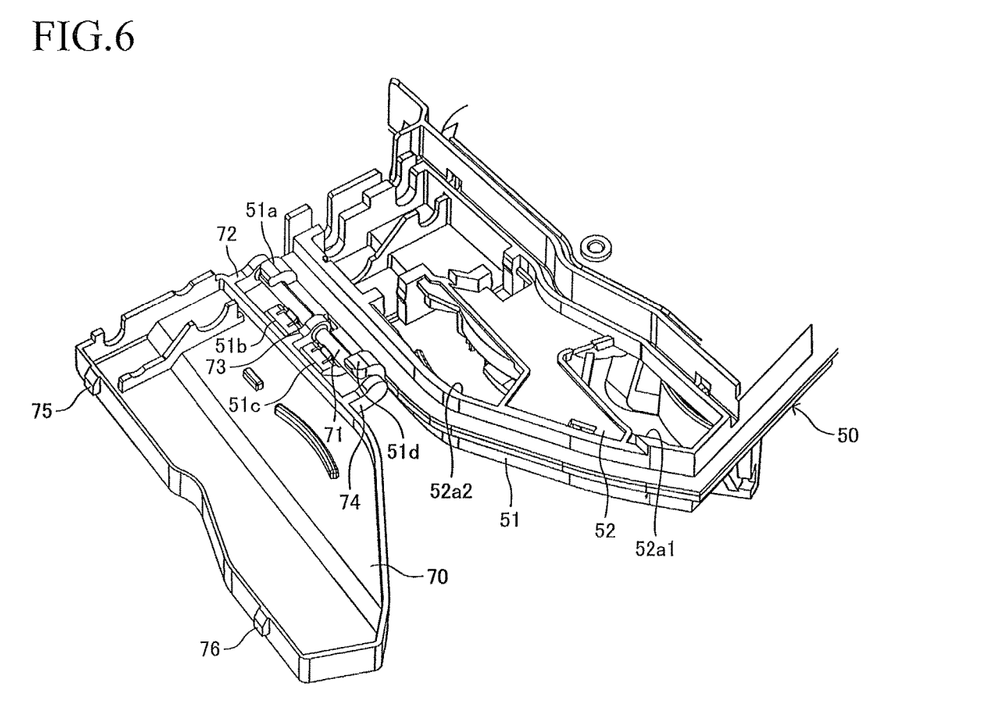
FIG. 6 is a perspective view of an opening side of the housing and the cover illustrated in FIG. 4.
Figure 7:
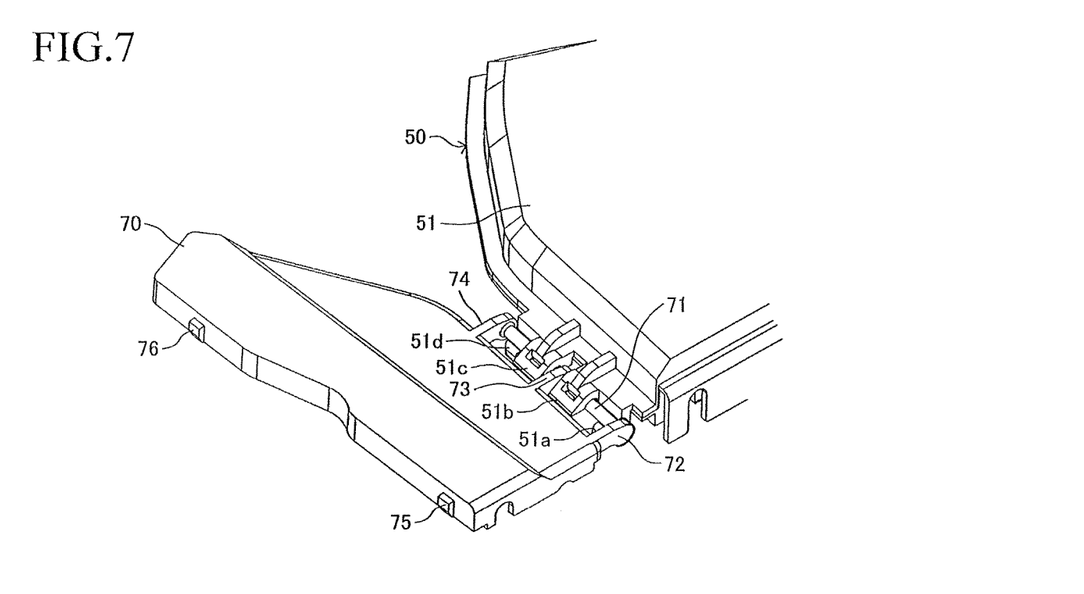
FIG. 7 is a perspective view of a back side of the housing and the cover illustrated in FIG. 6.
Figure 8:
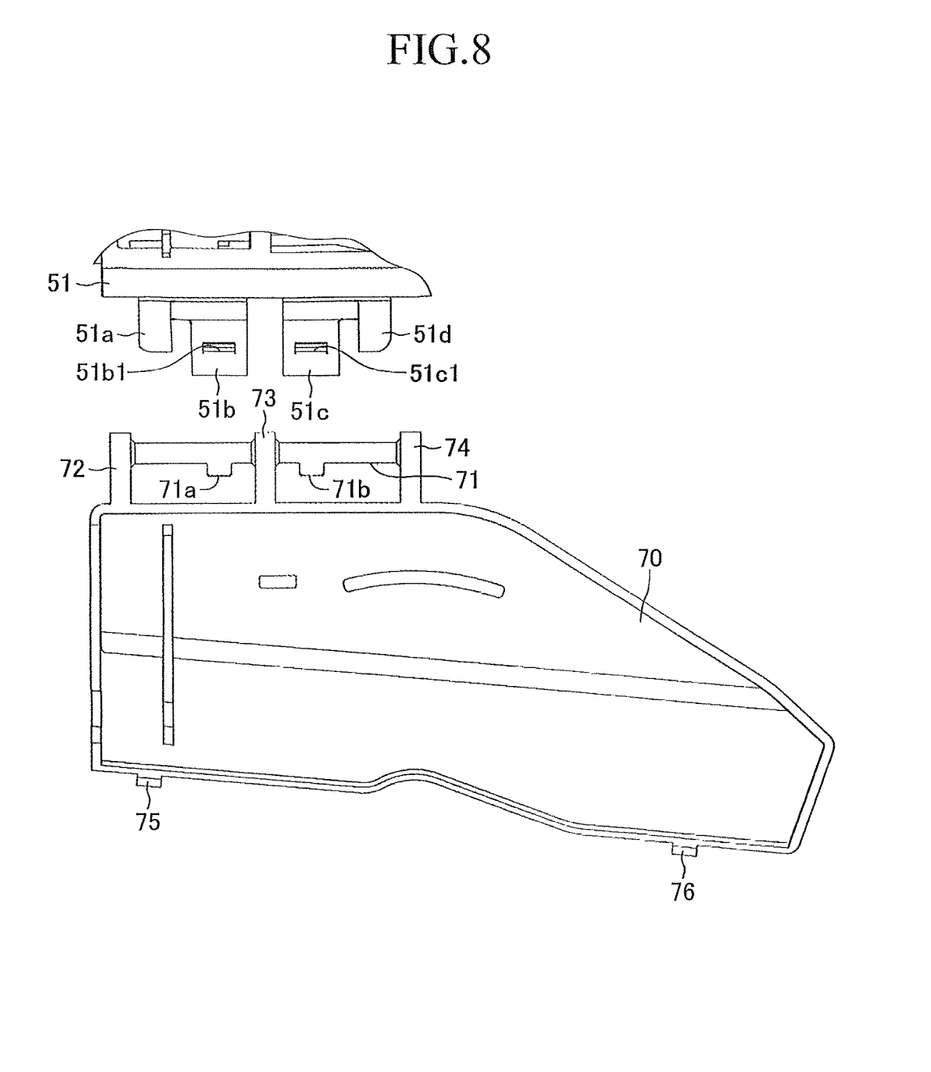
FIG. 8 is an exploded view of a state in which the cover illustrated in FIG. 4 is removed from the housing.
Figure 9:
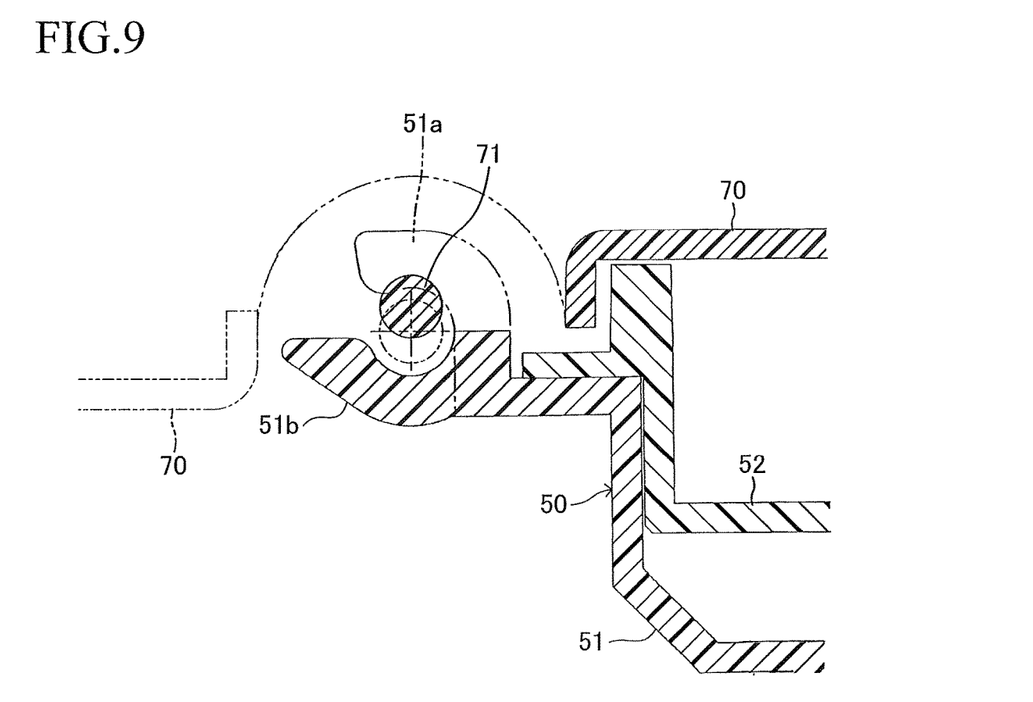
FIG. 9 is a sectional view taken along the line A-A of FIG. 2.
Figure 10:
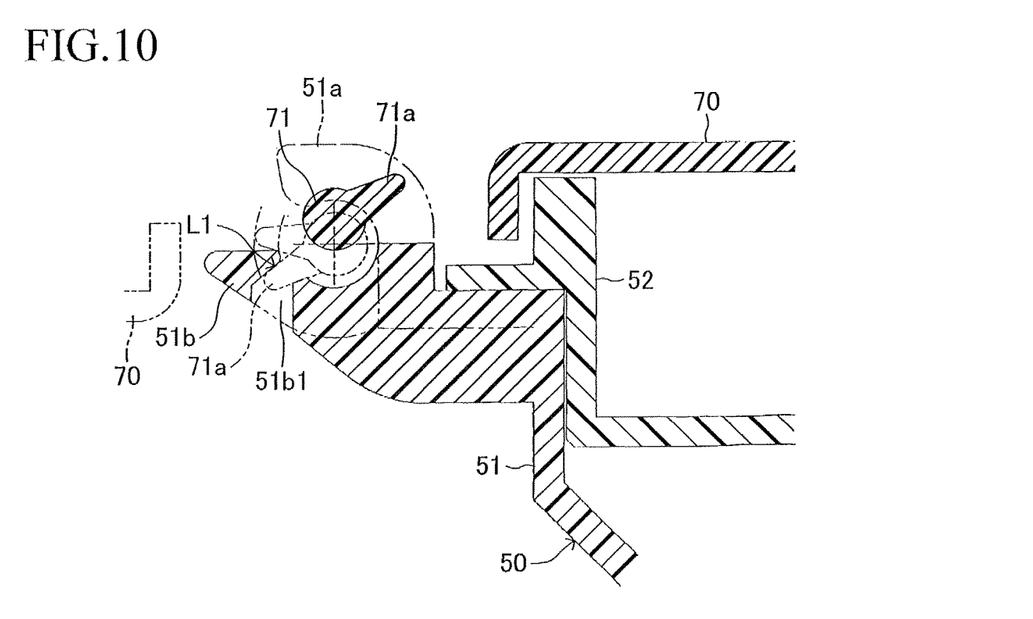
FIG. 10 is a sectional view taken along the line B-B of FIG. 2.
Figure 11:
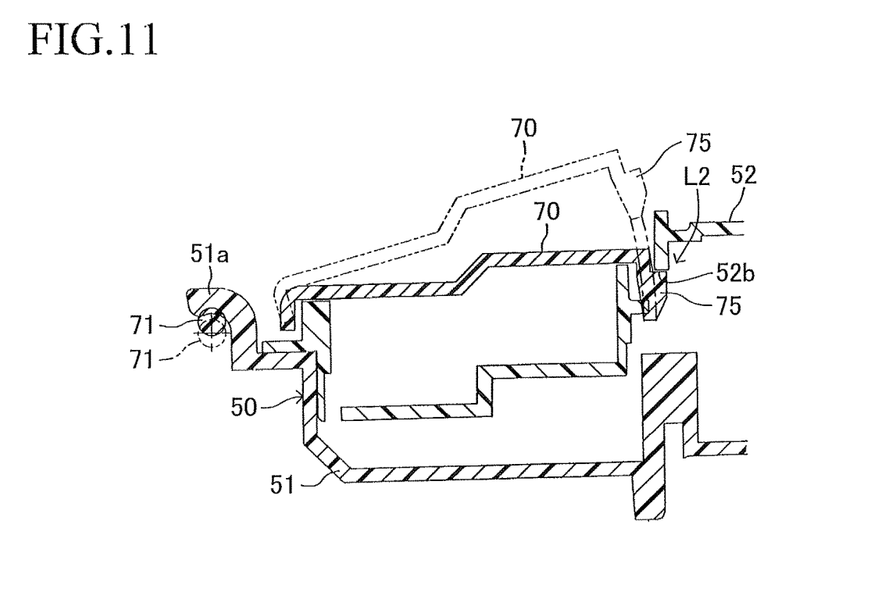
FIG. 11 is a sectional view taken along the line C-C of FIG. 2.
Figure 12:
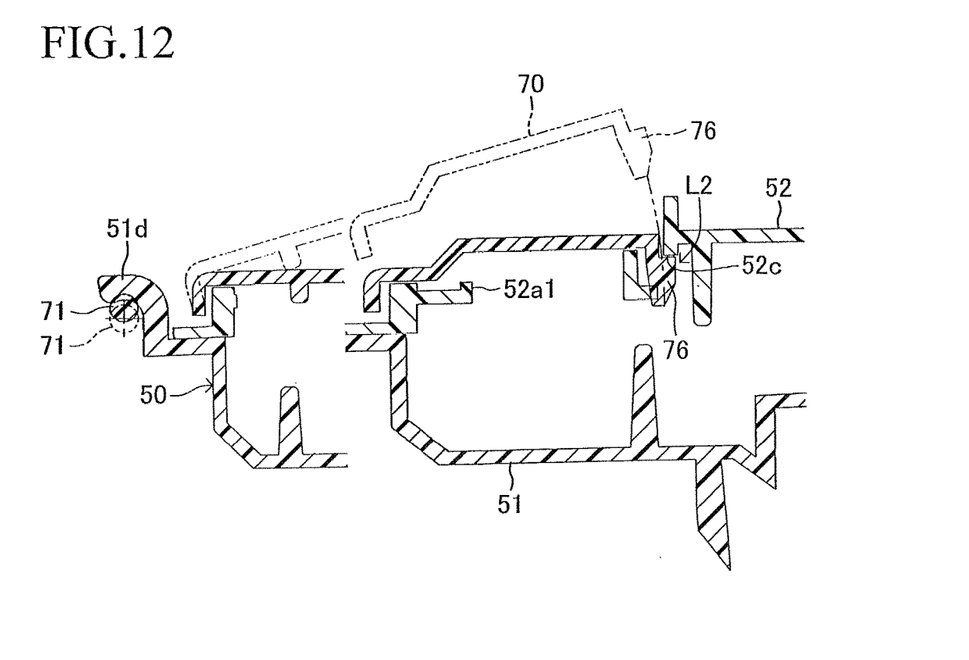
FIG. 12 is a sectional view taken along the line D-D of FIG. 2.

Further, in this embodiment, each of the housing 50 and the cover 70 includes a pair of temporary retaining mechanisms L1 (see FIGS. 4 and 5) and a pair of full retaining mechanisms L2 (see FIG. 2). Each of the temporary retaining mechanisms L1 is configured to temporarily retain the cover 70 in the opened state (state illustrated in FIGS. 4 to 7) relative to the housing 50 under a state in which the cover 70 is assembled to the housing 50 in a rotatable manner. As illustrated in FIG. 5, those temporary retaining mechanisms L1 include locking hole portions 51b1 and 51c1 formed in the retaining pieces 51b and 51c of the housing 50, and locking claw portions 71a and 71b formed on the rod 71 of the cover 70. When the locking claw portions 71a and 71b are elastically engaged with (fitted into) the locking hole portions 51b1 and 51c1 (see the imaginary lines of FIG. 10), respectively, a temporarily retaining state is attained.

Each of the full retaining mechanisms L2 is configured to retain the cover 70 in the closed state (state illustrated in FIG. 2) relative to the housing 50 under a state in which the cover 70 is assembled to the housing 50 in a rotatable manner. Those full retaining mechanisms L2 include locking hole portions 52b and 52c formed in the second housing part 52 of the housing 50, and locking projection portions 75 and 76 formed on the cover 70. When the locking projection portions 75 and 76 are elastically engaged with (fitted into) the locking hole portions 52b and 52c (see the solid lines of FIGS. 11 and 12), respectively, a retaining state is attained.

Further, in this embodiment, guides 71c, 71d, 71e, and 71f (see FIG. 5) are formed on the rod 71 of the cover 70 so as to regulate movement of the cover 70 relative to the housing 50 when the cover 70 assembled to the housing 50 is rotated between the opened state and the closed state. The guides 71c, 71d, 71e, and 71f are formed into a tapered shape, in which the guides 71c, 71d, 71e, and 71f are tapered toward the corresponding locking claw portions 71a and 71b, and are engageable with the retaining pieces (retaining portions) 51a, 51b, 51c, and 51d of the housing 50, respectively. Further, in this embodiment, the cover 70 includes a see-through portion 77 configured such that the coupling point between the operation cable 61 and the inside open lever 21 and the coupling point between the operation cable 62 and the active lever 44 are visible from outside the cover 70 in the closed state. The see-through portion 77 is, for example, a transparent portion, a translucent portion, or a thin portion. Note that, the thin portion is formed by thinning a part of the cover 70 (regions of the cover 70 in the closed state, which correspond to the coupling point between the operation cable 61 and the lever 21 and the coupling point between the operation cable 62 and the lever 44).

In the embodiment constructed as described above, the cover 70 is constructed separately from the housing 50, and is assembled to the housing 50 so as to be mountable on and demountable from the housing 50 and rotatable between the opened state and the closed state. Further, each of the housing 50 and the cover 70 includes the temporary retaining mechanisms L1 and L1 configured to temporarily retain the cover 70 in the opened state relative to the housing 50 under the state in which the cover 70 is assembled to the housing 50 in a rotatable manner, and the full retaining mechanisms L2 and L2 configured to retain the cover 70 in the closed state relative to the housing 50 under the state in which the cover 70 is assembled to the housing 50 in a rotatable manner.

Therefore, in this embodiment, as illustrated in FIGS. 4 to 7, the temporary retaining mechanisms L1 and L1 can temporarily retain the cover 70 in the opened state relative to the housing 50. Thus, during work of coupling (or decoupling) the operation cable 61 and the lever 21 through the opening 52a1 of the housing 50 and coupling (or decoupling) the operation cable 62 and the lever 44 through the opening 52a2 of the housing 50, the cover 70 is not freely moved, thereby being capable of easily carrying out the above-mentioned work without any hindrance of the work by the cover 70. Further, as illustrated in FIG. 2, the full retaining mechanisms L2 and L2 can retain the cover 70 in the closed state relative to the housing 50. Thus, the cover 70 can appropriately close the openings 52a1 and 52a2 of the housing 50.

Further, in this embodiment, the present invention can be carried out without employing a thin and easily-bendable hinge portion disclosed in, for example, JP 2002-129813 A at the coupling point between the housing 50 and the cover 70. Thus, there is no risk of breakage by bending even when the cover 70 is opened and closed (rotated) relative to the housing 50 many times under the state in which the cover 70 is assembled to the housing 50 in a rotatable manner. Therefore, in this embodiment, the cover 70 is not dropped off the housing 50 due to the breakage by bending, thereby being capable of maintaining satisfactory assemblability.

Further, in this embodiment, the cover 70 and the housing 50 can be constructed separately, and hence forming molds therefor can be downsized. As a result, the cost can be reduced.

Further, in this embodiment, the housing 50 and the cover 70 are made of different synthetic resins (the housing 50 is made of polyacetal and the cover 70 is made of polypropylene so that the materials are different in hardness), thereby being capable of suppressing hit noise between the housing 50 and the cover 70. Further, the cover 70 includes the guides (71*c*, 71*d*, 71*e*, and 71*f*) configured to regulate the movement of the cover 70 relative to the housing 50 when the cover 70 assembled to the housing 50 in a rotatable manner is rotated between the opened state and the closed state. Therefore, it is possible to attain satisfactory assemblability when the cover 70 assembled to the housing 50 in a rotatable manner is rotated between the opened state and the closed state. Further, the guides 71*c*, 71*d*, 71*e*, and 71*f* are formed into the tapered shape, in which the guides 71*c*, 71*d*, 71*e*, and 71*f* are engageable with the retaining pieces (retaining portions) 51*a*, 51*b*, 51*c*, and 51*d* of the housing 50, respectively. Therefore, the guides can be formed simply at low cost. Note that, the present invention may be carried out so that the guides configured to regulate the movement of the cover 70 relative to the housing 50 are formed on the housing.

Further, in this embodiment, the cover 70 includes the see-through portion 77 (for example, a transparent portion, a translucent portion, or a thin portion) configured such that the coupling point between the operation cable 61 and the lever 21 and the coupling point between the operation cable 62 and the lever 44 are visible from outside the cover 70 in the closed state. Therefore, the coupling state between the operation cable 61 and the lever 21 and the coupling state between the operation cable 62 and the lever 44 can be confirmed without opening the cover 70 in the closed state. As a result, the workability can be enhanced.

In the above-mentioned embodiment, the present invention is carried out so that the rod (engagement portion) 71 is formed on the cover 70 and the four retaining pieces (retaining portions) 51*a*, 51*b*, 51*c*, and 51*d* are formed in two pairs on the housing 50. Alternatively, the present invention may be carried out so that the retaining pieces (retaining portions) are formed on the cover and the rod (engagement portion) is formed on the housing. Further, in the above-mentioned embodiment, the present invention is carried out so that the four retaining pieces (retaining portions) 51*a*, 51*b*, 51*c*, and 51*d* are formed in two pairs on the housing 50. However, the number, shape, and the like of the retaining pieces (retaining portions) may be changed as appropriate, and are not limited to those of the above-mentioned embodiment.

Further, in the above-mentioned embodiment, the present invention is carried out so that the housing 50 (first housing part 51 and second housing part 52) is made of a synthetic resin (polyacetal) and the cover 70 is made of another synthetic resin (polypropylene). However, those materials (synthetic resin materials) may be changed as appropriate.

Note that, the housing 50 and the cover 70 may be made of materials other than the synthetic resins.

The invention claimed is:

1. A vehicle door lock device, comprising:
a housing having an opening and being configured to be assembled to a door of a vehicle;
a coupling member having a coupling member coupling portion and being configured to be coupled to an operation mechanism arranged on the door;
an operation lever being arranged inside the housing and having an operation lever coupling portion coupled to the coupling member coupling portion; and
a cover movable between an opened state in which the opening in the housing is open and a closed state in which the opening in the housing is closed and a coupling point between the coupling member coupling portion and the operation lever coupling portion is enclosed in the housing,
the cover being constructed separately from the housing and being rotatably mountable to and demountable from the housing so that when the cover is rotatably mounted to the housing, the cover is rotatable between the opened state and the closed state,
each of the housing and the cover comprising:
a temporary retaining mechanism configured to temporarily retain the cover in the opened state relative to the housing when the cover is rotatably mounted to the housing; and
a full retaining mechanism configured to retain the cover in the closed state relative to the housing when the cover is rotatably mounted to the housing.

2. A vehicle door lock device according to claim 1, wherein the housing and the cover are made of different synthetic resins.

3. A vehicle door lock device according to claim 1, wherein the housing or the cover comprises a guide configured to regulate movement of the cover relative to the housing when the cover is rotatably mounted to the housing and is rotated between the opened state and the closed state.

4. A vehicle door lock device according to claim 3,
wherein one of the housing and the cover comprises a retaining piece,
wherein another of the housing and the cover comprises a rod engageable with and disengageable from the retaining piece and rotatable relative to the retaining piece, and
wherein the rod comprises a tapered portion that functions as the guide.

5. A vehicle door lock device according to claim 4, wherein the temporary retaining mechanism comprises:
a locking hole portion formed in the retaining piece; and
a locking claw portion formed on the rod and elastically engageable with the locking hole portion.

6. A vehicle door lock device according to claim 1, wherein the cover comprises a see-through portion configured such that the coupling point between the coupling member and the operation lever is visible from outside the cover in the closed state.

7. A vehicle door lock device according to claim 6, wherein the see-through portion is formed by thinning a part of the cover.

8. A vehicle door lock device, comprising:
a housing mountable to a door of a vehicle, the housing including an interior and an opening providing access to the interior;

a coupling member configured to be coupled to an operation mechanism arranged on the door, the coupling member including a coupling member coupling portion;

an operation lever arranged in the interior of the housing, the operation lever including an operation lever coupling portion coupled to the coupling member coupling portion at a coupling point;

a cover constructed separately from the housing, the cover being rotatably mountable to the housing so that when the cover is rotatably mounted to the housing, the cover is rotatable between an opened state in which the opening in the housing is open to permit access to the coupling point and a closed state in which the opening in the housing is closed; and each of the housing and the cover comprising a temporary retaining mechanism configured to temporarily retain the cover in the opened state relative to the housing so that the cover is at a predetermined rotation position when the cover is rotatably mounted to the housing.

9. A vehicle door lock device according to claim 8, wherein the housing and the cover are made of different synthetic resins.

10. A vehicle door lock device according to claim 8, wherein the housing or the cover comprises a guide configured to regulate movement of the cover relative to the housing when the cover rotatably mounted to the housing is rotated between the opened state and the closed state.

11. A vehicle door lock device according to claim 8,
wherein one of the housing and the cover comprises a retaining piece,
wherein the other of the housing and the cover comprises a rod engageable with and disengageable from the retaining piece and rotatable relative to the retaining piece, and
wherein the rod comprises a tapered portion that functions as the guide.

12. A vehicle door lock device according to claim 8, wherein the temporary retaining mechanism comprises:
a locking hole portion formed in the retaining piece; and
a locking claw portion formed on the rod and elastically engageable with the locking hole portion.

13. A vehicle door lock device according to claim 8, wherein the cover comprises a see-through portion configured such that the coupling point between the coupling member coupling portion and the operation lever coupling portion is visible from outside the cover when the cover is rotatably mounted on the housing and is in the closed state.

14. A vehicle door lock device according to claim 8, wherein the see-through portion is a thinned part of the cover.

15. A vehicle door lock device, comprising:
a housing having an opening and being configured to be assembled to a door of a vehicle;

a coupling member having a coupling member coupling portion and being configured to be coupled to an operation mechanism arranged on the door;

an operation lever being arranged inside the housing and having an operation lever coupling portion coupled to the coupling member coupling portion at a coupling point;

a cover constructed separately from the housing, the cover being rotatably mountable to the housing so that when the cover is rotatably mounted to the housing, the cover is rotatable between an opened state in which the opening in the housing is open to permit access to the coupling point and a closed state in which the opening in the housing is closed;

each of the housing and the cover comprising:
a temporary retaining mechanism configured to temporarily retain the cover in the opened state relative to the housing when the cover is rotatably mounted to the housing;
a full retaining mechanism configured to retain the cover in the closed state relative to the housing when the cover is rotatably mounted to the housing;

the housing or the cover comprising a guide configured to regulate movement of the cover relative to the housing when cover is rotatably mounted to the housing and is rotated between the opened state and the closed state;

one of the housing and the cover comprising a retaining piece, and the other of the housing and the cover comprising a rod engageable with and disengageable from the retaining piece and rotatable relative to the retaining piece;

the rod comprising a tapered portion that functions as a guide that regulates movement of the cover relative to the housing when the cover is rotatably mounted to the housing and is rotated between the opened state and the closed state; and the temporary retaining mechanism comprising a locking hole portion formed in the retaining piece, and a locking claw portion formed on the rod and elastically engageable with the locking hole portion.

16. A vehicle door lock device according to claim 15, wherein the housing and the cover are made of different synthetic resins.

17. A vehicle door lock device according to claim 15, wherein the cover comprises a see-through portion configured such that the coupling point is visible through the see-through portion from outside the cover in the closed state.

18. A vehicle door lock device according to claim 15, wherein the see-through portion is formed by a thinned part of the cover.

* * * * *

UNITED STATES PATENT AND TRADEMARK OFFICE
CERTIFICATE OF CORRECTION

| | |
|---|---|
| PATENT NO. | : 9,834,962 B2 |
| APPLICATION NO. | : 14/430382 |
| DATED | : December 5, 2017 |
| INVENTOR(S) | : Makoto Suzumura et al. |

It is certified that error appears in the above-identified patent and that said Letters Patent is hereby corrected as shown below:

On the Title Page

In item (73), "AISIN KEIKI KABUSHIKI KAISHA" should read --AISIN SEIKI KABUSHIKI KAISHA--.

Signed and Sealed this
Twenty-seventh Day of March, 2018

Andrei Iancu
*Director of the United States Patent and Trademark Office*